(12) United States Patent
Lassen et al.

(10) Patent No.: US 11,555,550 B2
(45) Date of Patent: Jan. 17, 2023

(54) CAPSULE FOR A VALVE AND VALVE

(71) Applicant: Danfoss A/S, Nordborg (DK)

(72) Inventors: Simon Ahrens Lassen, Kolding (DK); Klaus Halldorsson, Kolding (DK); Jens Erik Rasmussen, Grasten (DK); Bjarne Hechmann Lagoni, Kolding (DK)

(73) Assignee: Danfoss A/S, Nordborg (DK)

( * ) Notice: Subject to any disclaimer, the term of this patent is extended or adjusted under 35 U.S.C. 154(b) by 0 days.

(21) Appl. No.: 16/065,976

(22) PCT Filed: Jan. 3, 2017

(86) PCT No.: PCT/EP2017/050093
§ 371 (c)(1),
(2) Date: Jun. 25, 2018

(87) PCT Pub. No.: WO2017/118637
PCT Pub. Date: Jul. 13, 2017

(65) Prior Publication Data
US 2019/0003607 A1 Jan. 3, 2019

(30) Foreign Application Priority Data
Jan. 4, 2016 (EP) .................................. 16150039

(51) Int. Cl.
*F16K 17/08* (2006.01)
*F16K 27/02* (2006.01)

(52) U.S. Cl.
CPC ........ *F16K 17/085* (2013.01); *F16K 27/0236* (2013.01)

(58) Field of Classification Search
CPC .. G05D 7/0113; G05D 7/012; G05D 16/0633; G05D 16/0402; G05D 16/0636;
(Continued)

(56) References Cited

U.S. PATENT DOCUMENTS 237,624 A * 2/1881 Soule ................... G05D 7/0126
137/505.38
479,234 A * 7/1892 Webb ................... F16K 17/105
137/491

(Continued)

FOREIGN PATENT DOCUMENTS

CN 1504710 A 6/2004
CN 102575584 A 7/2012
(Continued)

OTHER PUBLICATIONS

Machine Translation of DE20016214U1 from espacenet.com retrieved on Mar. 2020. (Year: 2020).*
(Continued)

*Primary Examiner* — Jessica Cahill
(74) *Attorney, Agent, or Firm* — McCormick, Paulding & Huber PLLC

(57) ABSTRACT

The invention relates to a capsule for a valve as well as to a valve comprising such a capsule. The task of the present invention is to provide a valve in which tight tolerances for construction can be achieved and the assembly of the valve is simplified. According to the present invention the above task is solved by a capsule (1) for a valve comprising at least one diaphragm (2), a valve seat (3), a capsule inlet (5) and a capsule outlet (6). The valve seat (3) is openable and closable to permit or stop a fluid flow from the capsule inlet (5) to the capsule outlet (6). The above task is also solved by a capsule (1) for a valve that comprises at least one diaphragm (2), a valve seat (3), a capsule inlet (5) and a capsule outlet (6), wherein the capsule (1) is structured and arranged to control the position of a pilot valve element external to the capsule (1). The above task is also solved by a valve (10) comprising a valve housing (15), wherein a capsule (1) of the above kind is arranged in the valve housing (15).

19 Claims, 12 Drawing Sheets

(58) Field of Classification Search
CPC ...... G05D 16/0683; F16J 3/02; F16K 17/085;
F16K 27/0236
USPC ............ 137/505.38, 505.39, 505.36, 505.12;
92/93, 96, 100, 101, 98 R
See application file for complete search history.

(56) References Cited

U.S. PATENT DOCUMENTS

| | | | | |
|---|---|---|---|---|
| 1,626,673 A * | 5/1927 | Farmer | ................... | B60T 17/18 |
| | | | | 92/95 |
| 2,189,750 A * | 2/1940 | Barge | ................... | G01F 15/02 |
| | | | | 73/254 |
| 2,413,380 A * | 12/1946 | Rush | ................... | F01B 19/02 |
| | | | | 91/170 R |
| 2,594,701 A * | 4/1952 | Wolf | ................... | F25B 41/062 |
| | | | | 251/61.3 |
| 2,720,887 A * | 10/1955 | Safford | ................... | G05D 16/0663 |
| | | | | 137/116.5 |
| 3,250,083 A | 5/1966 | Orth | | |
| 3,321,173 A * | 5/1967 | Seger | ................... | G05D 7/0113 |
| | | | | 137/505.22 |
| 3,405,730 A * | 10/1968 | Baumann | ................... | H03M 1/00 |
| | | | | 251/282 |
| 3,756,473 A | 9/1973 | Donahue, Jr. | | |
| 4,237,924 A * | 12/1980 | Benjamin | ................... | G05D 16/0658 |
| | | | | 251/86 |
| 4,265,270 A | 5/1981 | Satoh | | |
| 4,284,039 A * | 8/1981 | Bellicardi | ................... | F02M 69/52 |
| | | | | 123/463 |
| 4,336,824 A * | 6/1982 | Steineman | ................... | F16K 17/04 |
| | | | | 137/315.11 |
| 4,357,748 A * | 11/1982 | Branson | ................... | H01H 35/40 |
| | | | | 137/503 |
| 4,373,545 A * | 2/1983 | Knappe | ................... | F16K 1/446 |
| | | | | 251/86 |
| 4,653,528 A * | 3/1987 | Field | ................... | F02M 69/462 |
| | | | | 123/468 |
| 4,741,360 A * | 5/1988 | Affeldt | ................... | F02M 69/54 |
| | | | | 251/87 |
| 4,936,342 A * | 6/1990 | Kojima | ................... | F02M 69/54 |
| | | | | 251/126 |
| 5,018,500 A * | 5/1991 | Triolo | ................... | F02M 69/54 |
| | | | | 123/456 |
| 5,076,320 A | 12/1991 | Robinson | | |
| 5,163,472 A * | 11/1992 | Takada | ................... | F02M 69/54 |
| | | | | 123/457 |
| 5,213,126 A * | 5/1993 | Ono | ................... | G05D 16/163 |
| | | | | 137/15.22 |
| 5,275,201 A * | 1/1994 | Zimmerly | ........... | F15B 13/0835 |
| | | | | 137/625.5 |
| 5,609,138 A * | 3/1997 | Mutschler | ................ | F02M 69/54 |
| | | | | 123/456 |
| 5,810,041 A * | 9/1998 | Garofalo | ............ | B63C 11/2209 |
| | | | | 137/505.37 |
| 6,003,499 A * | 12/1999 | Devall | ................. | F02M 25/0836 |
| | | | | 123/516 |
| 6,318,405 B1 * | 11/2001 | Brandt | ................ | G05D 16/0663 |
| | | | | 137/484.2 |
| 6,422,265 B1 * | 7/2002 | Beyer | ................ | F02M 69/54 |
| | | | | 123/463 |
| 6,834,673 B2 * | 12/2004 | Robinson | ................ | F02M 37/44 |
| | | | | 137/565.13 |
| 7,850,754 B2 * | 12/2010 | Ruppel | ................ | F01M 13/04 |
| | | | | 55/315 |
| 8,459,297 B2 * | 6/2013 | Clifford | ................ | F16K 17/00 |
| | | | | 137/454.6 |
| 9,863,542 B2 * | 1/2018 | Glime | ................ | F16K 7/17 |
| 9,874,883 B2 * | 1/2018 | Clifford | ............ | G05D 16/0633 |
| 2001/0007338 A1 * | 7/2001 | Popp | ................ | F02M 21/0251 |
| | | | | 239/132.5 |
| 2002/0134433 A1 * | 9/2002 | Tomczak | ................ | F16K 41/12 |
| | | | | 137/510 |
| 2003/0042459 A1 | 3/2003 | Gregoire | | |
| 2005/0103383 A1 * | 5/2005 | Carroll | ................ | G06Q 10/10 |
| | | | | 137/505.28 |
| 2005/0229976 A1 * | 10/2005 | Kao | ................ | G05D 7/0113 |
| | | | | 137/501 |
| 2006/0090737 A1 * | 5/2006 | Pietschner | ............ | F01M 13/04 |
| | | | | 123/572 |
| 2008/0087038 A1 * | 4/2008 | Nicolaisen | ............. | F25B 9/008 |
| | | | | 62/498 |
| 2008/0142091 A1 * | 6/2008 | Meinig | ................ | F16K 7/17 |
| | | | | 137/488 |
| 2009/0235901 A1 | 9/2009 | Akita et al. | | |
| 2011/0174398 A1 * | 7/2011 | Clifford | ........... | G05D 16/0666 |
| | | | | 137/549 |
| 2012/0279584 A1 * | 11/2012 | Broker | ................ | F23N 1/002 |
| | | | | 137/487.5 |
| 2013/0228240 A1 * | 9/2013 | Noceti | ................ | F16K 5/08 |
| | | | | 137/505.39 |
| 2014/0319403 A1 * | 10/2014 | Kitano | ................ | F16K 7/16 |
| | | | | 251/331 |
| 2015/0129054 A1 * | 5/2015 | Simonsen | ........... | F15B 13/0426 |
| | | | | 137/486 |
| 2015/0211648 A1 * | 7/2015 | Frahm, II | ............ | F16K 15/066 |
| | | | | 137/505.42 |
| 2015/0247582 A1 * | 9/2015 | Vasquez | ........... | G05D 16/0633 |
| | | | | 137/540 |
| 2018/0120867 A1 * | 5/2018 | Bock | ................ | G05D 16/0641 |

FOREIGN PATENT DOCUMENTS

| | | | | |
|---|---|---|---|---|
| CN | 202300937 U | | 7/2012 | |
| CN | 103748392 A | | 4/2014 | |
| CN | 205207814 U | | 5/2016 | |
| DE | 3831474 A1 | | 4/1990 | |
| DE | 20016214 U1 * | | 2/2002 | ............ F01M 13/02 |
| DE | 102012221695 A1 | | 5/2014 | |
| EP | 0566826 A1 * | | 10/1993 | ............ F01M 11/04 |

OTHER PUBLICATIONS

Machine Translation of EP0566826 from espacenet.com retrieved on Mar. 2020. (Year: 2020).*
International Search Report for PCT Serial No. PCT/EP2017/050093 dated Jan. 26, 2017.

* cited by examiner

CAPSULE FOR A VALVE AND VALVE

CROSS-REFERENCE TO RELATED APPLICATION

This application is a National Stage application of International Patent Application No. PCT/EP2017/050093, filed on Jan. 3, 2017, which claims priority to European Patent Application No. 16150039.2, filed on Jan. 4, 2016, each of which is hereby incorporated by reference in its entirety.

TECHNICAL FIELD

The invention relates to a capsule for a valve as well as to a valve.

BACKGROUND

In many kinds of valves diaphragms are used to separate pressure chambers to allow a partial or complete pressure control of the valve. For example, pilot valves are often at least partially pressure regulated and comprise two or more pressure chambers that are separated by a diaphragm. The diaphragm can either comprise or cooperate with a valve element to close or open a valve seat depending on the pressure difference between the pressure chambers.

The diaphragm is usually fixed between parts of the valve housing when assembling the valve.

However, it can be difficult to achieve tight tolerances in construction and consequently a precise opening behavior this way. Furthermore, the known valves comprising diaphragms usually cannot be serviced and need to be replaced in case of a malfunction.

SUMMARY

The task underlying the present invention is therefore to provide valve parts for a valve as well as a valve that can be easier assembled and disassembled and that allows to achieve tighter tolerances in construction.

According to a first aspect of the present invention the above task is solved by a capsule for a valve that comprises at least one diaphragm, a valve seat, a capsule inlet and a capsule outlet, wherein the valve seat is openable to permit a fluid flow from the capsule inlet to the capsule outlet.

According to a second aspect of the present invention the above task is solved by a capsule for a valve that comprises at least one diaphragm, a valve seat, a capsule inlet and a capsule outlet, wherein the capsule is structured and arranged to control the position of the pilot valve element external to the capsule.

According to the two above aspects of the present invention the parts which usually require the tightest tolerances are therefore arranged in a capsule. Consequently, this capsule can be preassembled with a manufacture method that allows tighter tolerances. Afterwards the capsule can be inserted into a valve by manual assembly. Similarly, if a valve comprising such a capsule needs to be serviced, the complete capsule can be replaced which speeds up the servicing and reduces the risk of an incorrect or imprecise reassembly of the valve. Consequently, both the maintenance interval as well as the overall lifetime of a valve comprising a capsule according to the invention is increased. The capsule may comprise one, two, three or more diaphragms. Preferably, the diaphragms are stacked on top of each other. This has the advantage that a standard diaphragm can be used and the number of the standard diaphragms can be chosen according to the required strength and flexibility. The capsule can comprise one, two, three, four or more capsule inlets.

According to the first aspect, the valve seat is openable to permit a fluid flow from the capsule inlet to the capsule outlet, wherein the valve seat is closable to stop a fluid flow from the capsule inlet to the capsule outlet. In this case the capsule provides the main fluid path through the valve. The capsule may either be used for a pilot valve or may be part of a main valve.

According to the second aspect of the present invention the capsule does not constitute the "core" of the valve with the main flow path through the valve but rather may be part of a control and/or presetting mechanism for a main valve external to the capsule. The capsule may in this case serve to transform pressure forces resulting from a pressure difference over the diaphragm into a force on a valve element external to the capsule.

In a preferred embodiment the capsule comprises a capsule top and a capsule bottom, wherein at least one diaphragm is fixed at a radially outer end of the diaphragm between the capsule top and the capsule bottom. Preferably, two, three or more diaphragms are stacked on top of each other and fixed collectively at a radial outer end of the diaphragms between the capsule top and the capsule bottom. The use of a capsule top and a capsule bottom keeps the number of parts of the capsule small, while allowing a simple assembly of the capsule. Preferably, both the capsule inlet as well as the capsule outlet are arranged in either the capsule top or the capsule bottom. This way it is ensured that both the capsule inlet and the capsule outlet are connected to the same pressure chamber.

It is preferred if at least one diaphragm also has the function of a valve element to open or close the valve seat. In this embodiment one may dispense with the use of a dedicated valve element. This on the one hand allows for a more compact construction of the capsule and on the other hand allows to dispense with a dedicated valve element as well as a spring element for loading the valve element.

Alternatively, a valve element is arranged in the capsule in addition to the at least one diaphragm. Preferably, the valve element is arranged to open or close the valve seat. In this case a dedicated valve element is arranged in the capsule in addition to the at least one diaphragm. The valve element is preferably loaded by a spring element. However, the valve element can also serve to actuate a valve element external to the capsule, for example, by engaging a pin connected to the valve element.

It is preferred if the capsule comprises at least one thrust pad arranged at a first face of the at least one diaphragm opposite to a second face of the at least one diaphragm facing the valve seat. Such a thrust pad can for example allow a presetting mechanism of the valve to engage the capsule. Such a presetting mechanism for example allows to choose the minimum pressure difference between the two sides of the diaphragm necessary to open the valve. In case several stacked diaphragms are used the first face and the second face denote the surfaces of the outermost diaphragms.

It is preferred if the capsule comprises an aperture facing the thrust pad. Such an aperture allows a presetting mechanism of the valve to engage the thrust pad. At the same time such an aperture can allow a communication of pressure from one of the pressure chambers of the capsule to the valve. Depending on the valve this can either be the atmospheric pressure or a controllable presetting pressure of the valve.

It is preferred if the thrust pad comprises a converging bore on a side facing the aperture. This for example allows to center a presetting mechanism engaging the thrust pad. The assembly of the valve comprising a capsule according to the invention is thus simplified.

It is furthermore preferred if a spring is arranged in the capsule to load the valve element. Preferably, the spring is a wave spring. The spring is preferably arranged on the side of the at least one diaphragm facing the capsule inlet and/or the capsule outlet. The use of a spring to load to valve element is in particular preferable if the valve is used in a refrigeration system in which the fluid pressure can be lower than the atmospheric pressure. In this case the additional spring force ensures that the valve can be kept open even if the pressure on the side of the diaphragm facing the capsule inlet is lower than on the side of the diaphragm opposite the capsule inlet. An example of a refrigeration system operating with fluid pressures below atmospheric pressure are ammonia refrigeration systems.

In an embodiment, a recess is arranged in the valve seat to allow a pressure to be communicated across the valve seat at all times. This embodiment may allow the same pressure to be present at the second surface of the diaphragm as is present at the capsule outlet irrespective of the position of the valve element relative to the valve seat.

The above task is also solved by a valve comprising a valve housing, characterized in that a capsule according to any of the above embodiments is arranged in the valve housing. Preferably, the capsule is fixed between two parts of the valve housing of the valve.

It is preferred if the valve comprises a presetting mechanism. Such a presetting mechanism allows to choose the pressure differential between the pressure chambers on both sides of the at least one diaphragm that is necessary to keep the valve open. Such a presetting mechanism may for example engage the thrust pad mechanically or allow to change the pressure on one side of the at least one diaphragm.

Preferably, the presetting mechanism comprises a spring mechanism with an adjustable presetting force. The spring mechanism may to this end engage the thrust pad and in particular the converging bore of the thrust pad. The spring mechanism may be manually adjustable or may be adjustable via an electric actuator like a stepper motor.

In a further preferred embodiment the presetting mechanism comprises a pressure port to adjust the pressure on the side of the diaphragm opposite to the valve seat. This way the minimum pressure at the capsule inlet side of the diaphragm necessary to open the valve may be adjusted. This provides an override option to open or close the valve if necessary. If no pressure port is used the pressure on the side of the diaphragm opposite to the capsule inlet is preferably atmospheric pressure.

It is furthermore preferred if the presetting mechanism comprises a stepper motor to adjust the presetting force of the spring mechanism. This has the advantage that the minimum pressure difference between the two sides of the diaphragm necessary to open the valve can be adjusted and controlled externally for example by a control unit connected to the stepper motor.

It is furthermore preferred if the valve housing comprises a valve inlet and a valve outlet, wherein the valve inlet is connected to the capsule inlet and the valve outlet is connected to the capsule outlet. In this case, the main fluid path through the valve leads through the capsule.

Preferably, the valve is a pilot valve that comprises a valve element external to the capsule, wherein the pilot valve element is actuatable by a displacement of the valve element in the capsule. The valve element and the pilot valve element preferably are indirectly connected by a pin. The valve element can be fixed to one end of the pin. The valve element in the capsule can abut the opposite end of the pin. In this embodiment the main fluid path through the pilot valve may not lead through the capsule. The capsule may in this case be used to control the opening and closing of the valve by actuating the valve element towards a valve seat external to the capsule.

It is preferred if a first face of the at least one diaphragm is loaded by a presetting pressure while a second face of the at least one diaphragm is loaded by a pressure from the capsule inlet. The presetting pressure may for example be atmospheric pressure or an adjustable pressure provided by a pressure port of the presetting mechanism.

BRIEF DESCRIPTION OF THE DRAWINGS

Preferred embodiments of the invention are now described with reference to the figures, wherein.

DETAILED DESCRIPTION

Figure 1:
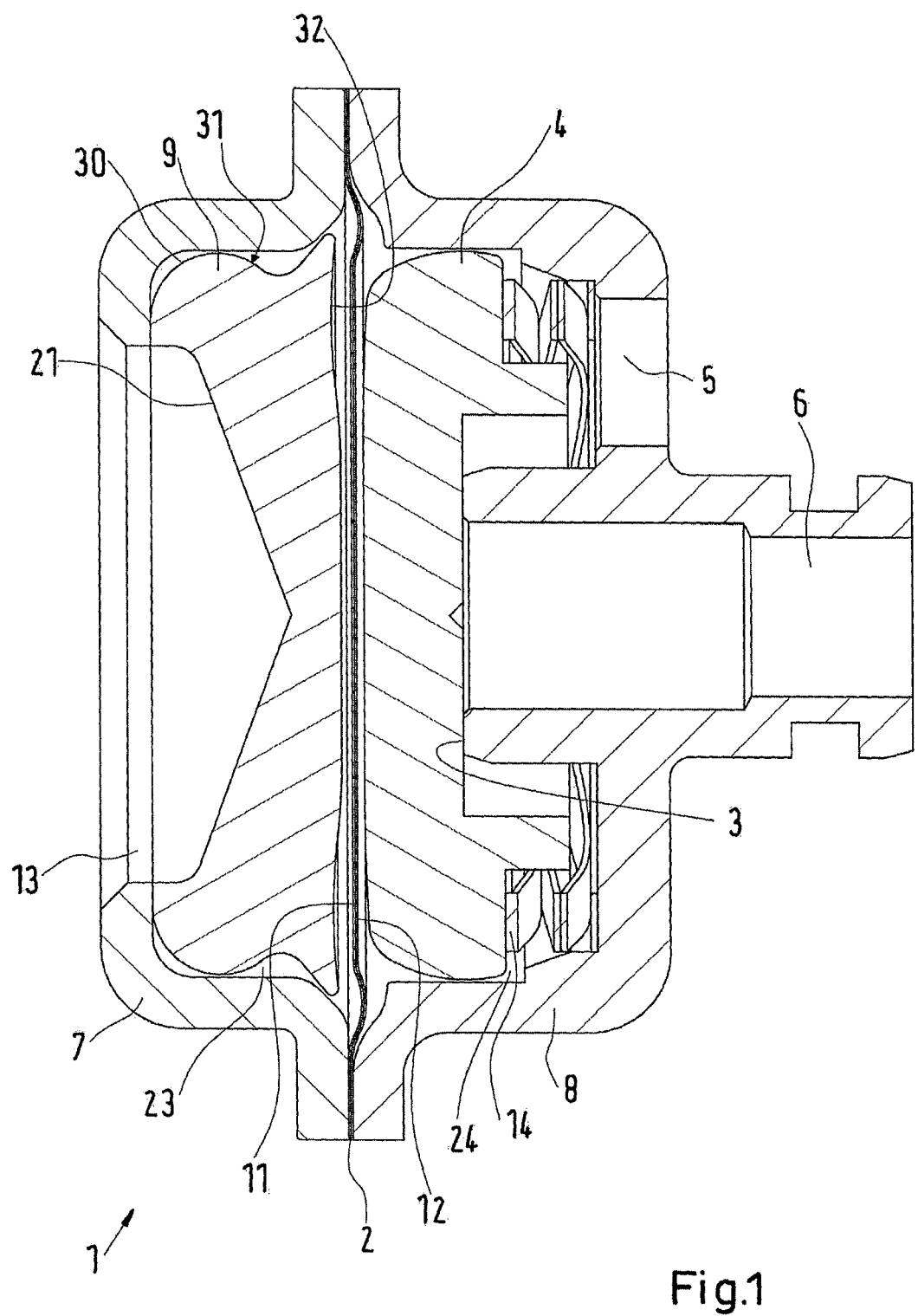
FIG. 1 shows a cut view of a first embodiment of a capsule according to the invention.
Figure 2:
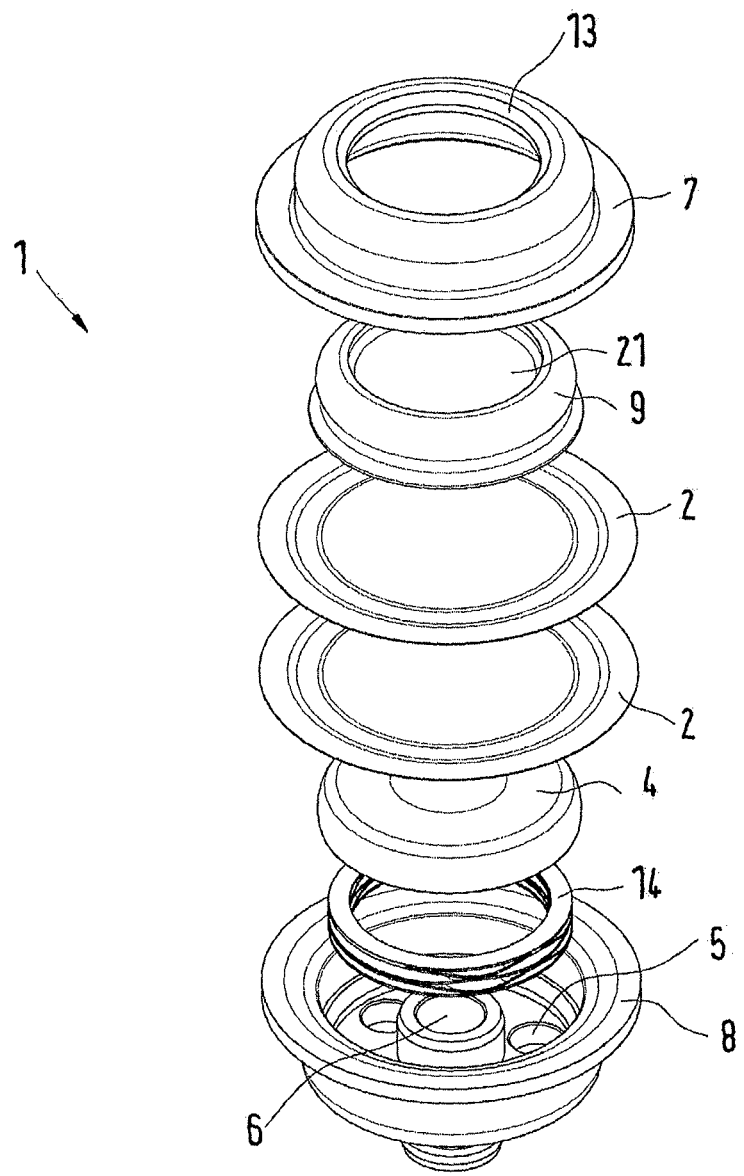
FIG. 2 shows an exploded view of a capsule according to the first embodiment.

FIGS. 1 and 2 show a first embodiment of a capsule 1 according to the invention. The capsule 1 comprises at least one diaphragm 2, in this case two diaphragms 2. The diaphragms 2 are fixed to the capsule 1 at circumferential ends of the diaphragms 2. Here the diaphragms 2 are fixed between a capsule top 7 and a capsule bottom 8 at the outer ends of the diaphragms 2. The capsule top 7 and the capsule bottom 8 can be welded together by laser welding. The rest of the diaphragms 2 and in particular a central portion of the diaphragms 2 can move more or less freely inside the capsule 1. The capsule 1 furthermore comprises a valve seat 3 as well as a valve element 4. The valve element 4 is loaded by a spring 14. The spring 14 rests against the capsule bottom 8 at the end of the spring opposite to the valve element 4. The spring 14 here is a wave spring that is shown in more detail in FIG. 7.

The capsule 1 in this embodiment comprises two capsule inlets 5 as well as one capsule outlet 6.

The thrust pad 9 comprises a converging bore 21 that is aligned with an aperture 13 of the capsule top 7. This way a presetting mechanism of the valve can engage the thrust pad 9. The capsule 1 comprises two pressure chambers 23, 24 arranged on either side of the diaphragms 2. In the shown cut view of FIG. 1 the diaphragms 2 are in a neutral position, which they will usually not assume during operation of the valve because the pressure difference between the pressure chambers 23, 24 will almost always be non-zero. The valve element 4 will be lifted from the valve seat to open a fluid flow from the capsule inlets 5 to the capsule outlet 6 when the force of the spring 14 is larger than the differential pressure force acting on the valve element 4 through the diaphragm 2 as well as an optional presetting force that can act on the thrust pad 9 via a presetting mechanism that will later be described in more detail. In particular in ammonia refrigeration systems the fluid pressure at the inlet side of the diaphragm 2 can be well below atmospheric pressure, so the spring 14 may have to overcome a differential pressure force.

The thrust pad 9 is arranged in the pressure chamber 23. The thrust pad 9 is arranged neighboring a first face 11 of the diaphragms 2 opposite to the valve seat 3. The valve element 4 on the other hand is arranged neighboring a second face 12 of the diaphragms 2 in the pressure chamber 24.

The thrust pad 9 has a cylinder like shape. A rounded circumferential corner 30 of the thrust pad 9 between a side facing the aperture 13 and a radially outer surface 31 has a larger radius of curvature than a neighboring corner of the capsule top 7. This way one may avoid the thrust pad 9 sticking to the capsule top 7 in case the thrust pad 9 tilts during operation. The radially outer surface 31 may furthermore have a wave-like cross section to further avoid a sticking of the thrust pad 9 to the capsule top 7.

The thrust pad 9 comprises a circular recess 32 on the side facing the diaphragm 2. The circular recess 32 is preferably arranged at a radially outer end of the side facing the diaphragm 2. The circular recess 32 increases the lifetime of the capsule 1 and in particular of the diaphragm 2 because it reduces the wear of the diaphragm 2.

Figure 3:
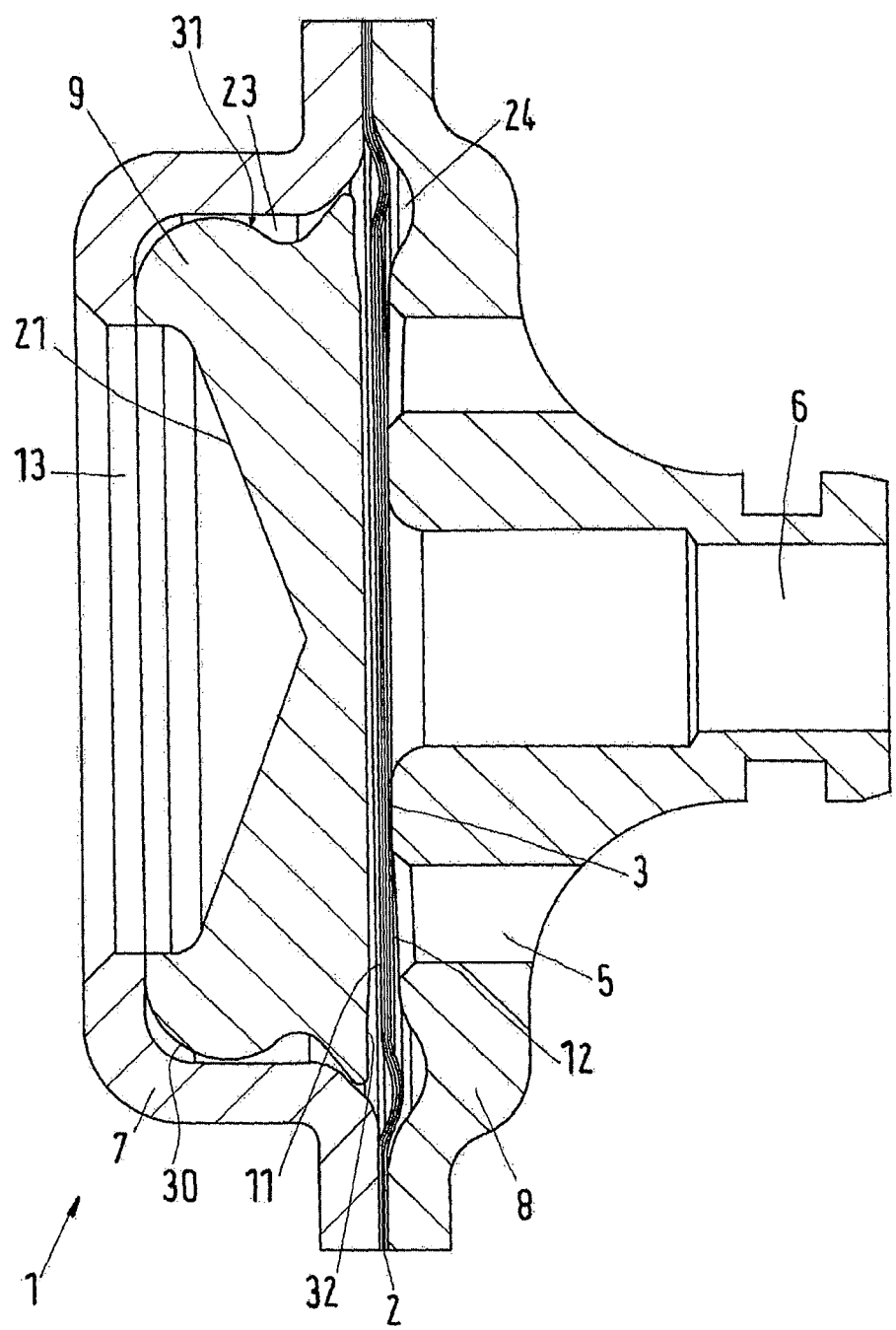
FIG. 3 shows a cut view of a second embodiment of a capsule according to the invention.
Figure 4:
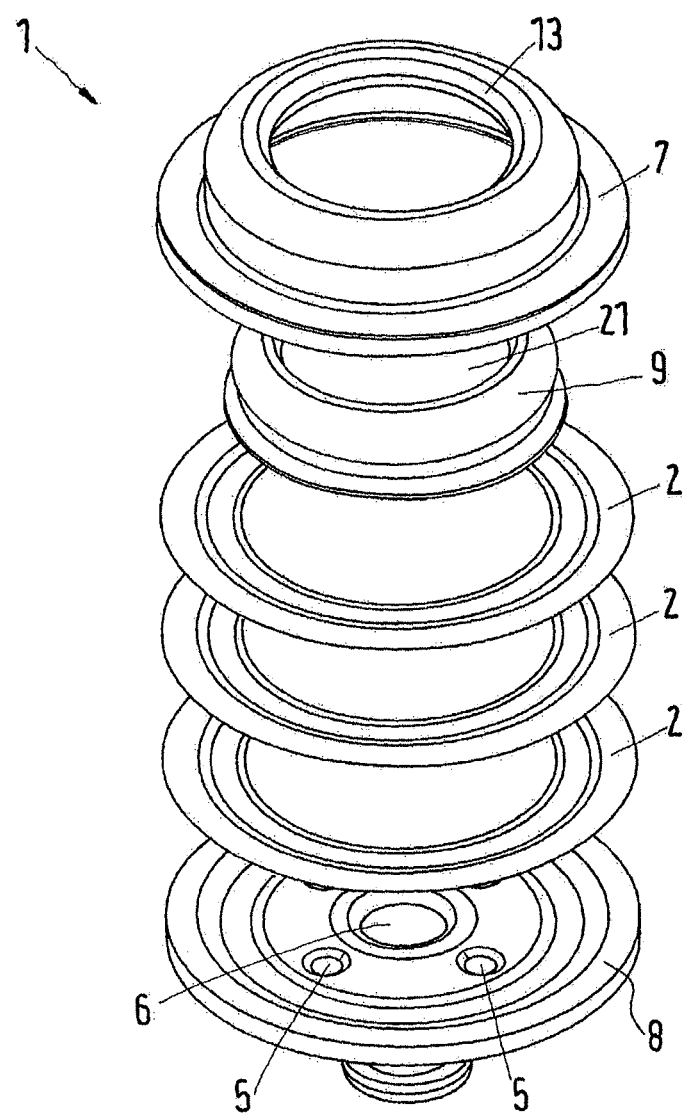
FIG. 4 shows an exploded view of a capsule according to the second embodiment.

FIGS. 3 and 4 show a second embodiment of a capsule 1 according to the invention. Corresponding elements are denoted with the same reference signs as in the previous embodiment. In this embodiment the diaphragms 2 also have the function of a valve element to open or close the valve seat 3. Consequently, in contrast to the first embodiment no dedicated valve element is used. A spring is also omitted. This embodiment is simpler in construction compared to the first embodiment and is for example advantageous if the fluid that has to be controlled is usually not entering the valve at a pressure below atmospheric pressure. Consequently, the fluid pressure itself may depending on the presetting force be sufficient to keep the valve open. A further difference to the first embodiment is that in the second embodiment three diaphragms 2 are used. Furthermore, the second embodiment comprises four capsule inlets 5 in contrast to the first embodiment. Apart from the named differences the remaining features of the second embodiment correspond to those of the first embodiment.

Figure 5:
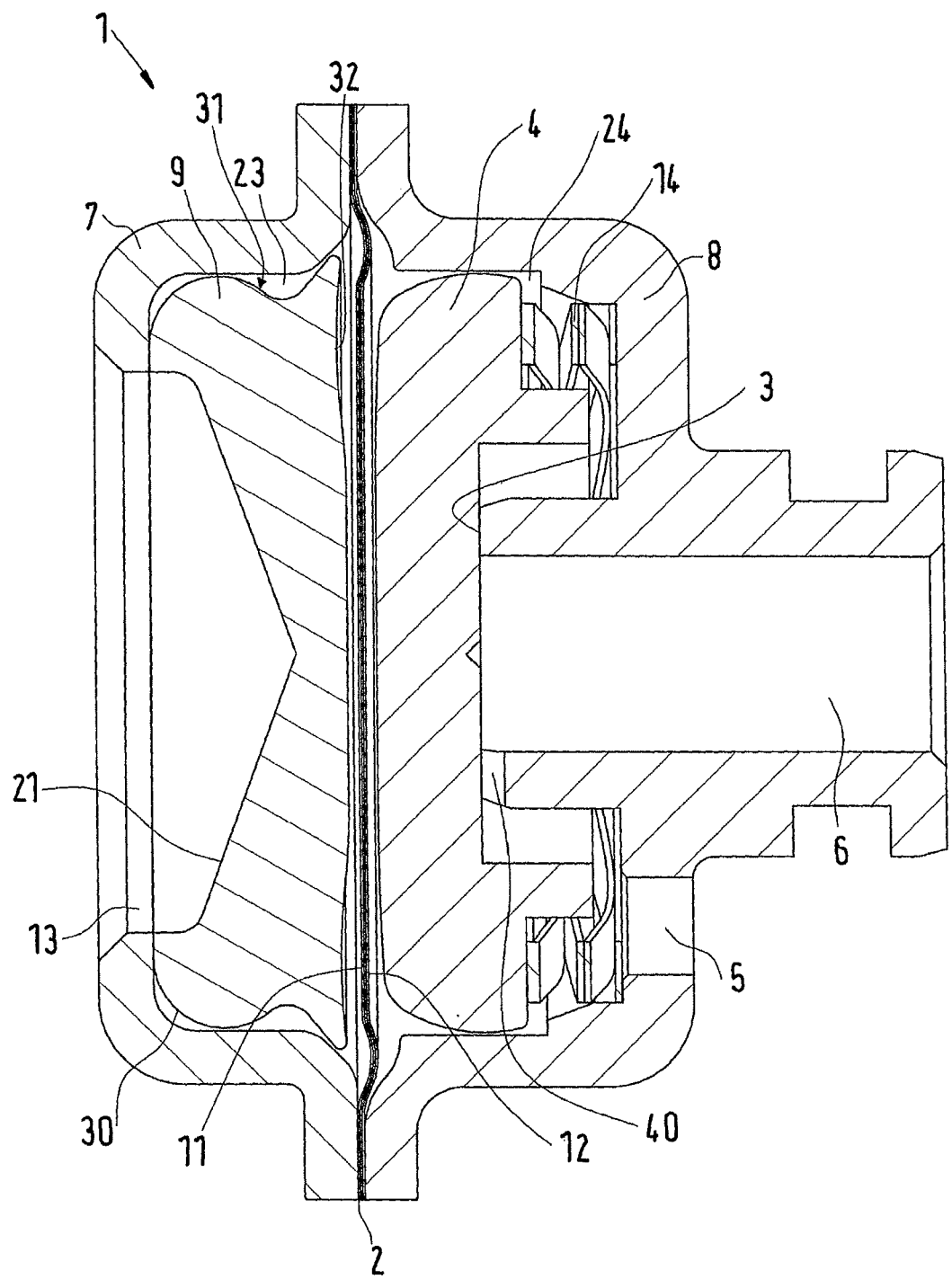
FIG. 5 shows a cut view of a third embodiment of a capsule according to the invention
Figure 6:
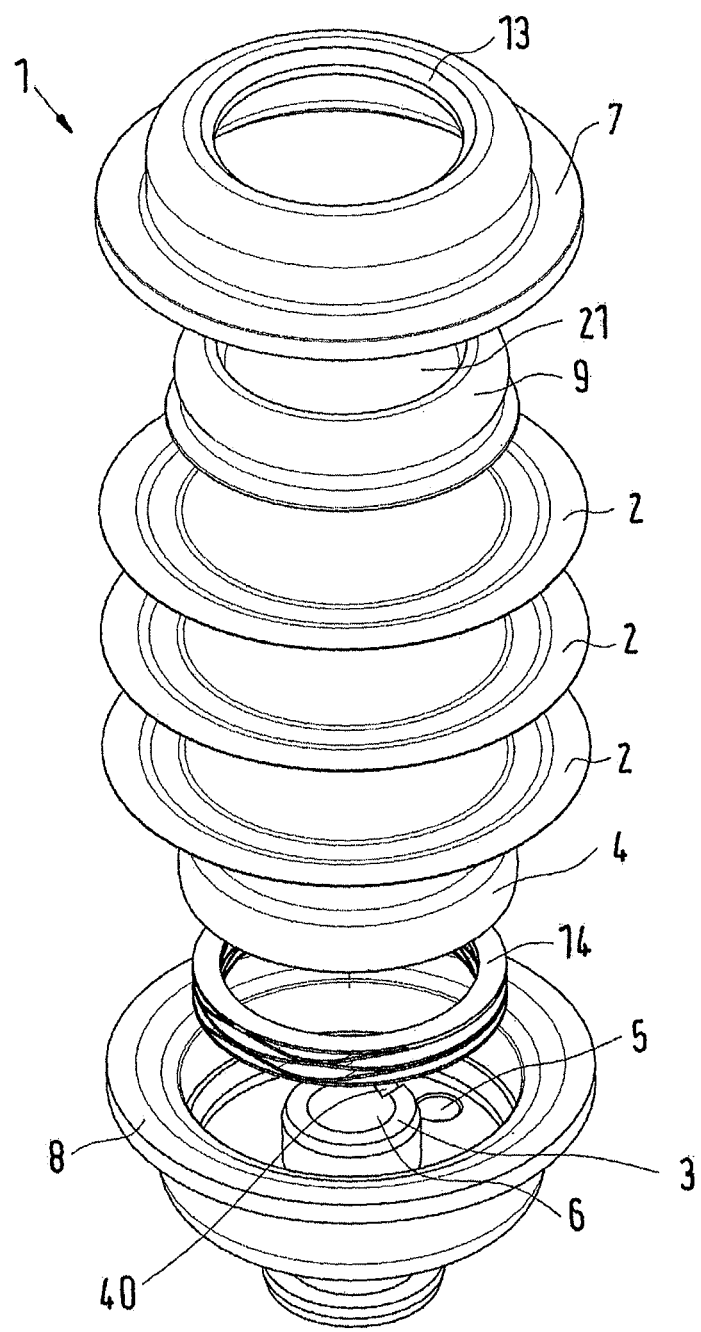
FIG. 6 shows an exploded view of a capsule according to the third embodiment.

FIGS. 5 and 6 show a third embodiment of a capsule 1 according to the invention. Again corresponding features to the first two embodiments are denoted with the same reference signs. The third embodiment is mostly identical to the first embodiment apart from three differences. First of all there is only one capsule inlet 5 instead of three capsule inlets. Furthermore, three diaphragms 2 are used instead of two diaphragms.

Lastly, a recess 40 is arranged in the valve seat 3. Thereby, a communication of pressure across the valve seat 3 between the capsule outlet 6 and the pressure chamber 24 is permitted irrespective of the position of the valve element 4 relative to the valve seat 3. In this embodiment the capsule 1 may be used to control the position of a pilot valve element external to the capsule 1. A corresponding embodiment will be shown in FIG. 11 later on.

Figure 7:
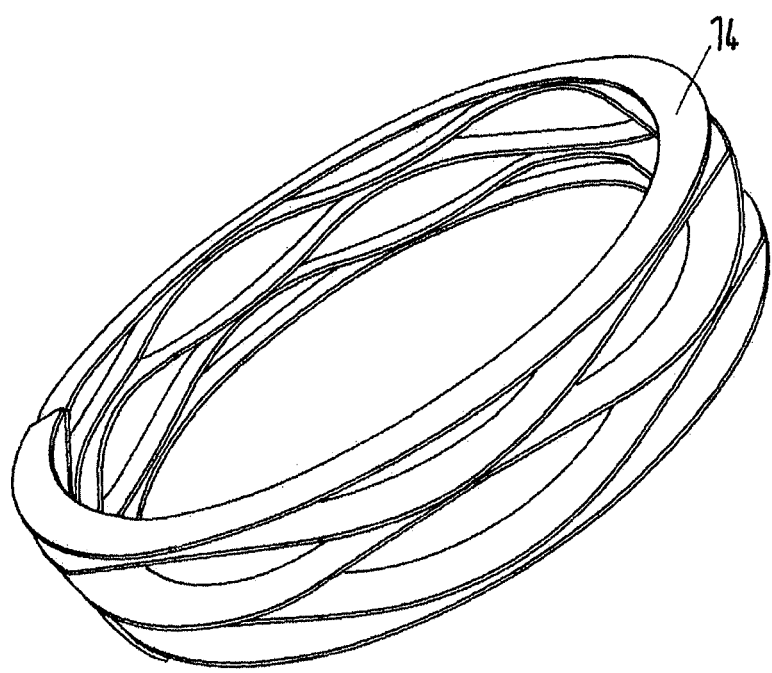
FIG. 7 shows a spring as used in a capsule according to the first and third embodiments.

A spring 14 in the shape of a wave spring is shown in FIG. 7, as used in the first and third embodiments.

FIGS. 8 to 11 show embodiments of the valve according to the invention in which the valve is a pilot valve to be used together with a main valve. The pilot valve can in these embodiments control the opening and closing behavior of the main valve.

Figure 8:
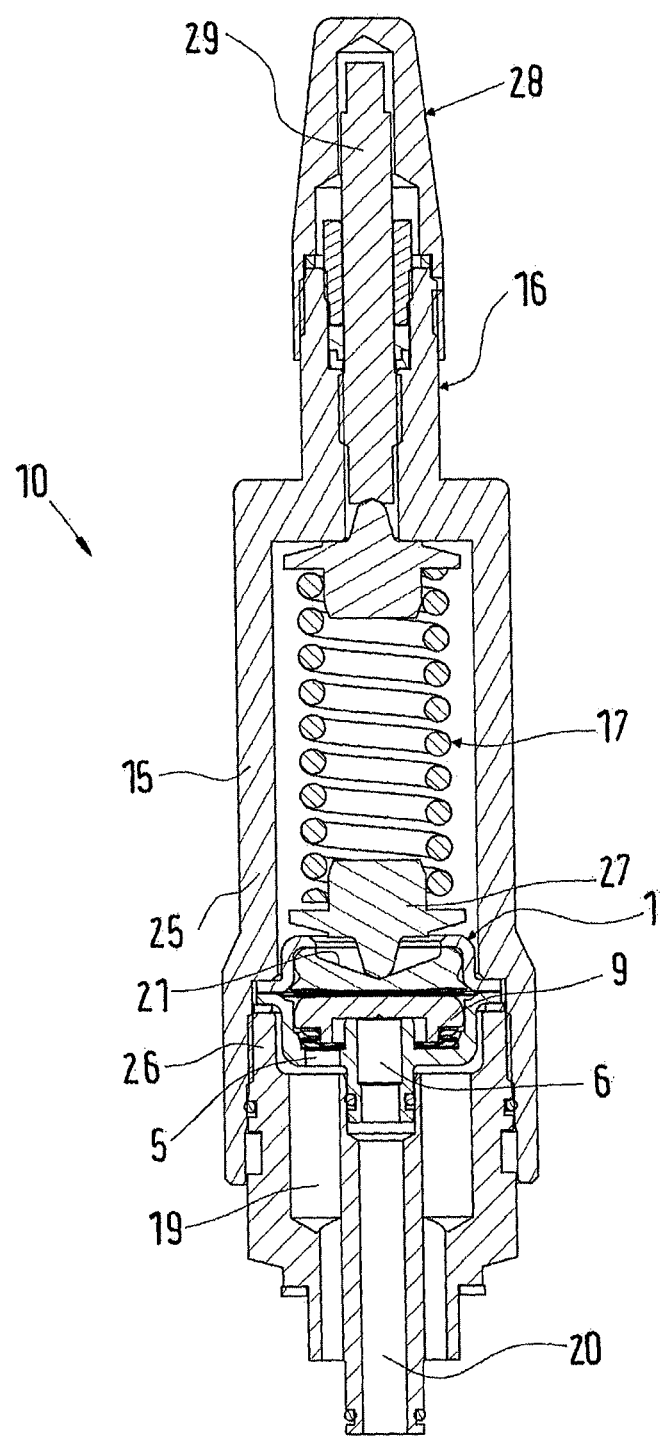
FIG. 8 shows a fourth embodiment according to the invention.

FIG. 8 shows a fourth embodiment according to the invention of a valve 10. The valve 10 comprises a capsule 1 according to any of the above embodiments. The valve 10 comprises a valve housing 15 in which the capsule 1 is arranged. The valve housing 15 here comprises a first housing part 25 and a second housing part 26 between which the capsule 1 is fixed. The valve 10 comprises valve inlets 19 which are connected to the capsule inlets 5 of the capsule 1. An outlet 20 is connected to the capsule outlet 6 of the capsule 1.

The valve 10 furthermore comprises a presetting mechanism 16. The presetting mechanism 16 in this embodiment comprises a spring mechanism 17. The spring mechanism 17 comprises a thrust head 27 to engage the converging bore 21 of the thrust pad 9. The spring mechanism 17 allows to adjust the minimum pressure differential necessary to open the valve. The presetting force of the spring mechanism 17 can be adjusted by a presetting spindle 29. The presetting spindle 29 is here covered by a protective cap 28.

In this embodiment the pressure in the pressure chamber 23 of the capsule 1 will usually be given by atmospheric pressure.

Figure 9:
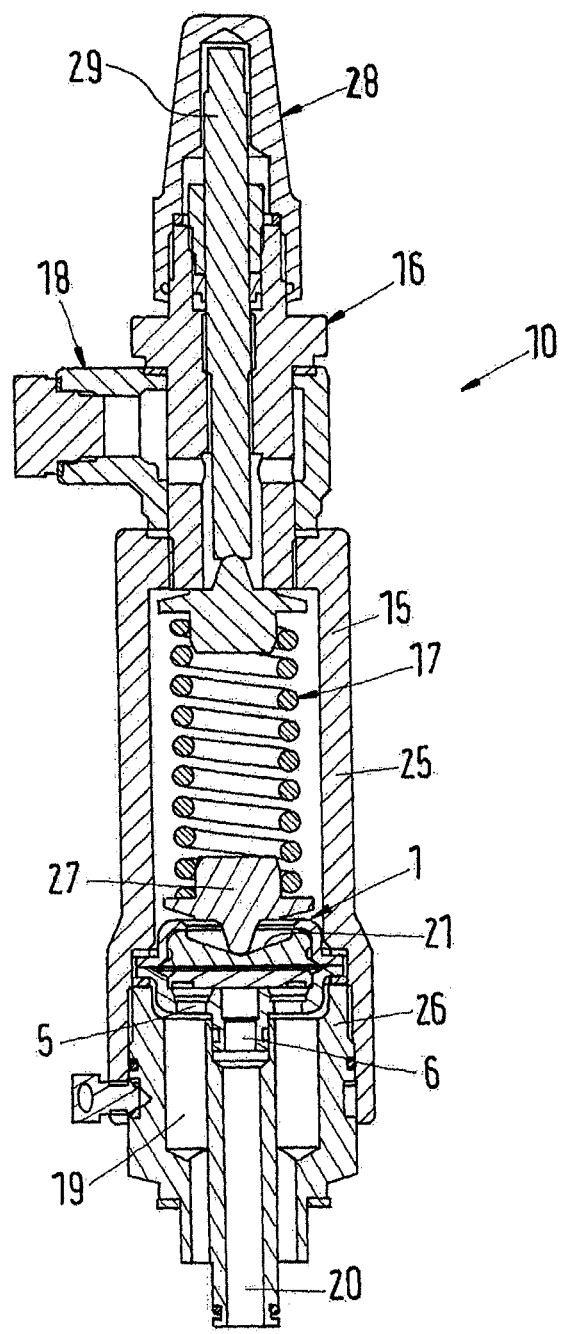
FIG. 9 shows a fifth embodiment according to the invention.

FIG. 9 shows a fifth embodiment according to the invention. Corresponding features to the previous embodiments are denoted with the same reference signs. This embodiment is mostly identical to the fourth embodiment except for an additional presetting means. The presetting mechanism 16 here in addition to a spring mechanism 17 with a presetting handle 29 also comprises a pressure port 18. The pressure port 18 allows to change the pressure in the pressure chamber 23 on the side of the diaphragm 2 opposite to the valve seat. Consequently, by increasing the pressure on the side of the diaphragm opposite to the valve seat the minimum pressure necessary on the side of the capsule inlet 5 to open the valve is increased. This embodiment is more flexible with respect to the fluids and pressures the valve 10 can be used with.

Figure 10:
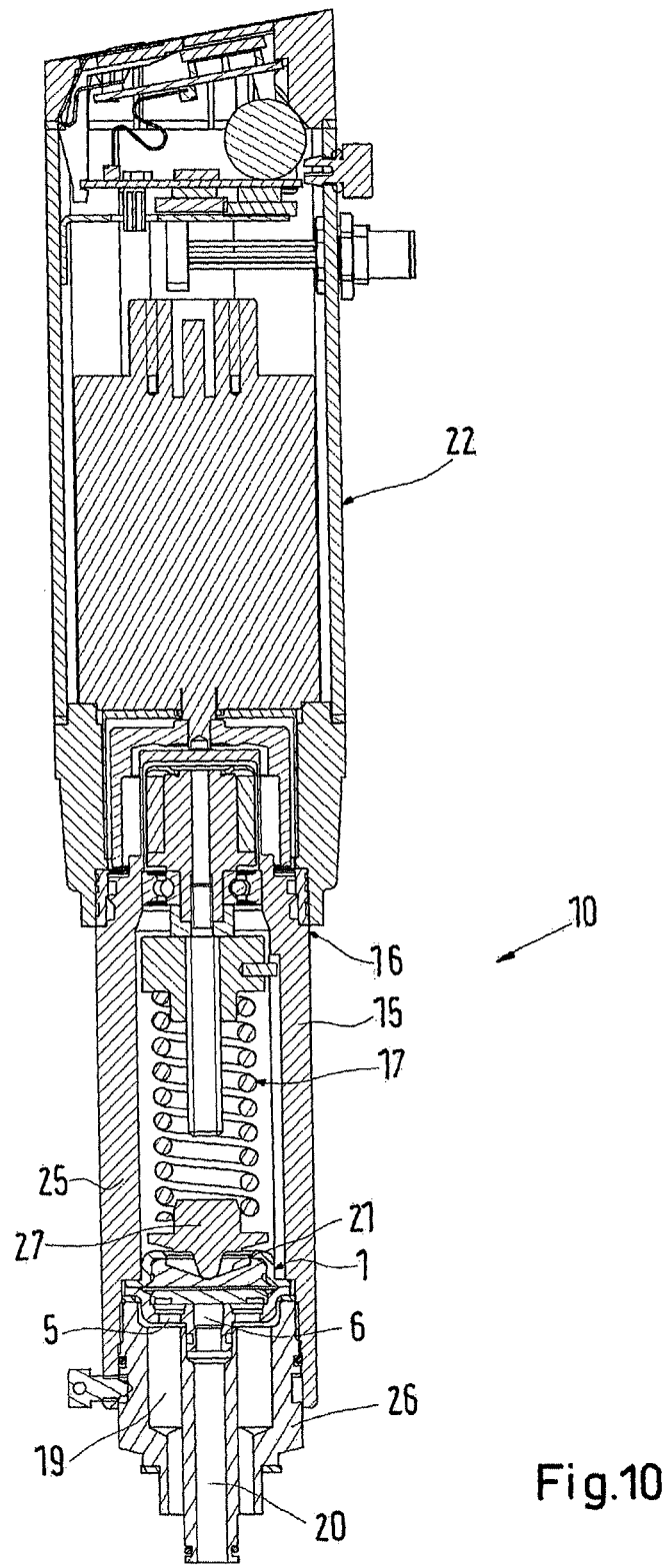
FIG. 10 shows a sixth embodiment according to the invention.

FIG. 10 shows a sixth embodiment according to the invention. Again corresponding features to the previous embodiments are denoted with the same reference signs. The sixth embodiment is similar to the fourth embodiment in that the presetting mechanism 16 comprises a spring mechanism 17. However, the presetting mechanism 17 here is controlled by a stepper motor 22. The stepper motor 22 can for example be controlled by an external control unit which allows to control the opening pressure differential of the valve during operation of the valve 10.

Figure 11:
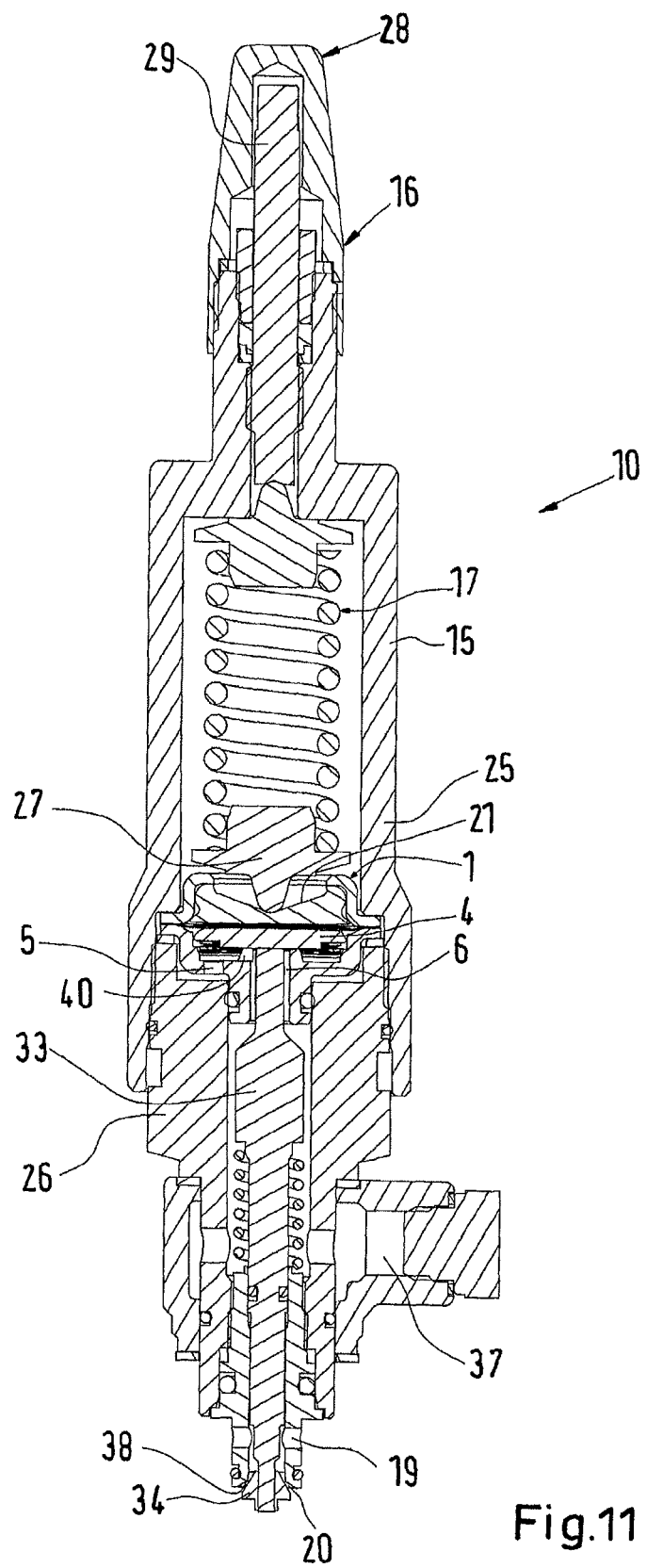
FIG. 11 shows a seventh embodiment according to the invention.

FIG. 11 shows a seventh embodiment according to the invention. In this embodiment of the valve 10 the capsule 1 serves to indirectly control the opening behavior of the pilot valve 10. The valve 10 in this embodiment comprises a pilot valve element 34 external to the capsule 1. The pilot valve element 34 is actuatable by a displacement of the valve element 4 in the capsule 1. The valve element 4 and the pilot valve element 34 are indirectly connected by a pin 33. One axial end of the pin 33 abuts the valve element 4. The opposite end of the pin 33 is connected to the pilot valve element 34. The pilot valve element 34 is axially displaceable towards or away from a pilot valve seat 38 external to the capsule 1. The capsule 1 is connected to a pressure port 37 which provides a reference pressure used to control the opening or closing of the valve 10. The presetting mechanism 16 here similarly to the embodiments according to FIGS. 8 and 9 comprises a spring mechanism 17.

The main flow path through the valve 10 does not lead through the capsule 1 in this embodiment. The capsule 1 serves to actuate and preset the valve 10 together with the presetting mechanism 16. The valve 10 according to FIG. 11 is to be used together with a main valve with a housing to which the valve inlet 19 and the valve outlet 20 connect.

This embodiment comprises a capsule 1 according to the embodiment of FIGS. 5 and 6. Consequently, a recess 40 is arranged in the valve seat 3 of the capsule 1. Thereby, substantially the same pressure may be present at the pressure port 37 and across the second surface 12 in the pressure chamber 24 irrespective of the position of the valve element 4 relative to the valve seat 3.

Figure 12:
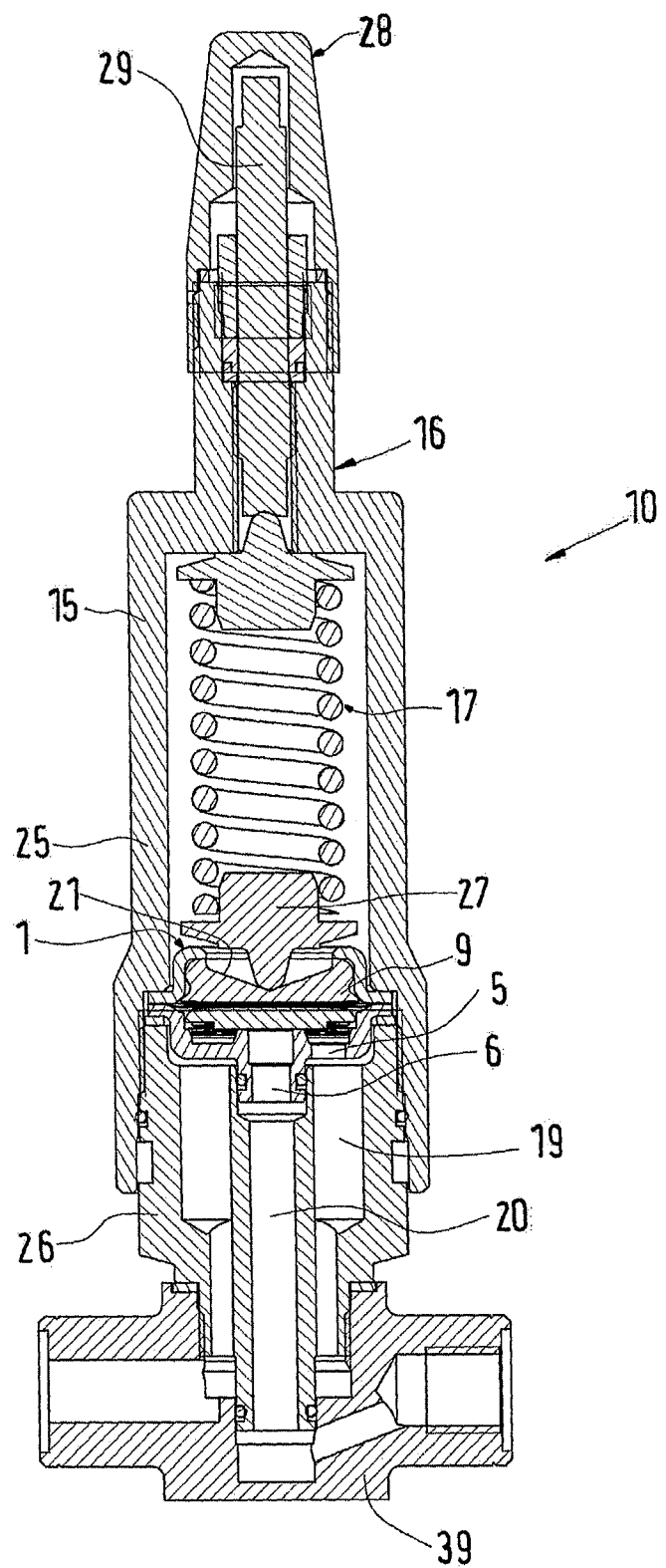
FIG. 12 shows an eighth embodiment according to the invention.

FIG. 12 shows an eighth embodiment according to the invention. Contrary to the previous embodiments the valve 10 here is a main valve, or in other words the capsule 1 is not part of a pilot valve. The valve 10 here is a regulating valve controlling the flow through the valve via the pressure difference over the diaphragm. When comparing to the embodiment according to FIG. 8 the valve housing 15 here comprises an additional housing part 39 which extends the valve inlet 19 and the valve outlet 20.

While the present disclosure has been illustrated and described with respect to a particular embodiment thereof, it should be appreciated by those of ordinary skill in the art that various modifications to this disclosure may be made without departing from the spirit and scope of the present disclosure.

What is claimed is:

1. A valve comprising a valve housing, a valve inlet, and a valve outlet, wherein a capsule is replaceably arranged entirely in the valve housing, wherein the capsule comprises a capsule top and a capsule bottom, wherein the capsule comprises at least one diaphragm, a valve seat, a capsule inlet, a capsule outlet, and a spring, wherein the at least one diaphragm has a first face and a second face being opposite to the first face and facing the valve seat and the capsule outlet, wherein the spring is arranged in the capsule to load a valve element to open the valve seat, wherein the spring is arranged to a side of the at least one diaphragm facing the capsule outlet, and the capsule further comprising at least one thrust pad arranged at the first face of the at least one diaphragm and an aperture facing the thrust pad, wherein the capsule includes a first pressure chamber adjacent the first face and a second pressure chamber adjacent the second face, wherein the first and second pressure chambers are not fluidly connected, wherein the aperture is a throughhole configured to accommodate a thrust head of a presetting mechanism extending therethrough, wherein the valve inlet is connected to the capsule inlet and the valve outlet is connected to the capsule outlet such that a main fluid path of the valve leads through the capsule, wherein the valve comprises the presetting mechanism extending between the valve housing and the capsule, and wherein the valve seat is arranged in the second pressure chamber of the capsule and the valve element opens and closes flow through the valve seat.

2. The valve according to claim 1, wherein the at least one diaphragm is fixed at a radially outer end of the diaphragm between the capsule top and the capsule bottom.

3. The valve according to claim 1, wherein the at least one diaphragm also has the function of cooperating with the valve element to open or close the valve seat.

4. The valve according to claim 1, wherein the thrust pad comprises a converging bore on a side facing the aperture.

5. The valve according to claim 1, wherein the presetting mechanism comprises a spring mechanism with an adjustable presetting force.

6. The valve according to claim 5, wherein the presetting mechanism comprises a stepper motor to adjust the presetting force of the spring mechanism.

7. The valve according to claim 1, wherein the presetting mechanism comprises a pressure port to adjust pressure on the side of the diaphragm opposite to the valve seat.

8. The valve according to claim 1, wherein the valve is a pilot valve that comprises a pilot valve element external to the capsule, wherein the pilot valve element is actuatable by a displacement of the valve element in the capsule.

9. The valve according to claim 1, wherein the first face of the at least one diaphragm is loaded by a presetting pressure while the second face of the at least one diaphragm is loaded by a pressure from the capsule inlet.

10. The valve according to claim 1, wherein the valve housing comprises a first part and a second part, wherein the capsule is fixed between the first part and the second part, and wherein the first part and the second part are threadedly connected allowing for disconnection of the first part and the second part to allow removal of the capsule from the valve housing.

11. The valve according to claim 1, wherein the capsule inlet and the capsule outlet are configured such that a flow path allowed by the capsule inlet is parallel to a flow path allowed by the capsule outlet.

12. The valve according to claim 1, wherein the valve inlet and the valve outlet are configured such that a flow path allowed by the valve inlet is parallel to a flow path allowed by the valve outlet.

13. A valve comprising a valve housing, a valve inlet, and a valve outlet, wherein a capsule is replaceably arranged entirely in the valve housing, wherein the capsule comprises a capsule top and a capsule bottom, wherein the capsule comprises at least one diaphragm, a valve seat, a capsule inlet, a capsule outlet, and a spring, wherein the at least one diaphragm has a first face and a second face being opposite to the first face and facing the valve seat and the capsule outlet, wherein the spring is arranged in the capsule to load a valve element to open the valve seat, wherein the spring is arranged to a side of the at least one diaphragm facing the capsule outlet, and the capsule further comprising at least one thrust pad arranged at the first face of the at least one diaphragm and an aperture facing the thrust pad, wherein the capsule includes a first pressure chamber adjacent the first face and a second pressure chamber adjacent the second face, wherein the first and second pressure chambers are not fluidly connected, wherein the capsule does not include a spring element arranged within the first pressure chamber, wherein the valve inlet is connected to the capsule inlet and the valve outlet is connected to the capsule outlet such that a main fluid path of the valve leads through the capsule, wherein the valve comprises a presetting mechanism extending between the valve housing and the capsule, and wherein the valve seat is arranged in the second pressure chamber of the capsule and the valve element opens and closes flow through the valve seat.

14. The valve according to claim 13, wherein the at least one diaphragm is fixed at a radially outer end of the diaphragm between the capsule top and the capsule bottom.

15. The valve according to claim 13, wherein the at least one diaphragm also has the function of cooperating with the valve element to open or close the valve seat.

16. The valve according to claim 13, wherein the thrust pad comprises a converging bore on a side facing the aperture.

17. The valve according to claim 13, wherein the valve housing comprises a first part and a second part, wherein the capsule is fixed between the first part and the second part, and wherein the first part and the second part are threadedly connected allowing for disconnection of the first part and the second part to allow removal of the capsule from the valve housing.

18. The valve according to claim 13, wherein the capsule inlet and the capsule outlet are configured such that a flow path allowed by the capsule inlet is parallel to a flow path allowed by the capsule outlet.

19. The valve according to claim 13, wherein the valve inlet and the valve outlet are configured such that a flow path allowed by the valve inlet is parallel to a flow path allowed by the valve outlet.

* * * * *